(12) United States Patent
Yoon et al.

(10) Patent No.: US 11,538,476 B2
(45) Date of Patent: Dec. 27, 2022

(54) TERMINAL DEVICE, SERVER AND CONTROLLING METHOD THEREOF

(71) Applicant: Samsung Electronics Co., Ltd., Suwon-si (KR)

(72) Inventors: Sanghyuk Yoon, Suwon-si (KR); Heejun Song, Suwon-si (KR); Heejae Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 17/103,150

(22) Filed: Nov. 24, 2020

(65) Prior Publication Data

US 2021/0166687 A1    Jun. 3, 2021

(30) Foreign Application Priority Data

Nov. 28, 2019    (KR) .................. 10-2019-0156136

(51) Int. Cl.
*G10L 15/22*        (2006.01)
*G10L 15/30*        (2013.01)

(52) U.S. Cl.
CPC .............. *G10L 15/22* (2013.01); *G10L 15/30* (2013.01); *G10L 2015/223* (2013.01); *G10L 2015/227* (2013.01)

(58) Field of Classification Search
USPC .................................................... 704/1–504
See application file for complete search history.

(56) References Cited

U.S. PATENT DOCUMENTS

| | | | |
|---|---|---|---|
| 6,615,172 B1* | 9/2003 | Bennett | G06F 16/374 704/E15.047 |
| 8,849,670 B2* | 9/2014 | Di Cristo | G10L 15/19 704/270.1 |
| 10,832,674 B2* | 11/2020 | Jaygarl | G10L 15/26 |
| 10,860,096 B2* | 12/2020 | Kelly | G06F 3/165 |
| 10,956,007 B2* | 3/2021 | Choi | G06F 16/532 |
| 2012/0069131 A1* | 3/2012 | Abelow | G06Q 30/0601 345/589 |
| 2014/0006022 A1* | 1/2014 | Yoon | H04N 21/234336 704/235 |

(Continued)

FOREIGN PATENT DOCUMENTS

| | | |
|---|---|---|
| KR | 10-1891492 B1 | 8/2018 |
| KR | 10-2019-0064313 A | 6/2019 |
| KR | 10-2019-0064314 A | 6/2019 |

*Primary Examiner* — Marcus T Riley
(74) *Attorney, Agent, or Firm* — Jefferson IP Law, LLP

(57) ABSTRACT

A terminal device is provided and includes a communication interface including circuitry, a display and at least one processor configured to control the communication interface to transmit a user voice including a plurality of intents to an external server, based on word use information included in the user voice and summary information regarding the user voice generated based on user-related information being received from the external server, control the display to display the received summary information, based on a user feedback regarding the summary information being input, transmit information regarding the user feedback to the external server, and based on response information regarding the user voice generated based on the user feedback being received from the external server, control the display to provide the response information.

20 Claims, 9 Drawing Sheets

(56) References Cited

U.S. PATENT DOCUMENTS

| | | | |
|---|---|---|---|
| 2014/0244258 A1* | 8/2014 | Song | G10L 15/18 |
| | | | 704/249 |
| 2018/0331839 A1* | 11/2018 | Gao | G06Q 10/107 |
| 2019/0013017 A1* | 1/2019 | Kang | G06N 5/04 |
| 2019/0042079 A1* | 2/2019 | Choi | G06F 3/0488 |
| 2019/0066677 A1* | 2/2019 | Jaygarl | G06F 40/30 |
| 2021/0166687 A1* | 6/2021 | Yoon | G10L 15/30 |

* cited by examiner

TERMINAL DEVICE, SERVER AND CONTROLLING METHOD THEREOF

CROSS-REFERENCE TO RELATED APPLICATION(S)

This application is based on and claims priority under 35 U.S.C. § 119(a) of a Korean patent application number 10-2019-0156136, filed on Nov. 28, 2019, in the Korean Intellectual Property Office, the disclosure of which is incorporated by reference herein in its entirety.

BACKGROUND

1. Field

The disclosure relates to a terminal device that responds to a user voice, a server and a controlling method thereof.

2. Description of the Related Art

A verbose question may be input to a call center chat-bot, a voice assistant, etc. For example, a user may ask a key question followed by verbose additional explanation, mention verbose additional explanation before asking a key question, or ask several questions at once.

A chat-bot of the related art determine a user's one speech as one intent, and usually respond to the user by providing a predetermined single answer. Therefore, when a user's question is composed of several sentences or multiple intents, the existing chat-bot may not understand the user's question or provide an inappropriate answer.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a terminal device that provides accurate answer even if a user voice including a plurality of sentences is input, a server and a controlling method thereof.

Additional aspects will be set forth in part in the description which follows and, in part, will be apparent from the description, or may be learned by practice of the presented embodiments.

In accordance with an aspect of the disclosure, a terminal device is provided. The terminal device includes a communication interface including circuitry, a display and at least one processor configured to control the communication interface to transmit a user voice including a plurality of intents to an external server, based on word use information included in the user voice and summary information regarding the user voice generated based on user-related information being received from the external server, control the display to display the received summary information, based on a user feedback regarding the summary information being input, transmit information regarding the user feedback to the external server, and based on response information regarding the user voice generated based on the user feedback being received from the external server, control the display to provide the response information.

In accordance with another aspect of the disclosure, a server is provided. The server includes a communication interface including circuitry and at least one processor configured to, based on identifying that a user voice received from a terminal device through the communication interface includes a plurality of intents, obtain word use information and user-related information from the user voice, identify a response order regarding the plurality of intents based on the obtained word use information and user-related information, and control the communication interface to provide information regarding the plurality of intents and summary information including response order information regarding each of the plurality of intents to the terminal device.

In accordance with another aspect of the disclosure, a controlling method of a terminal device is provided. The controlling method includes transmitting a user voice including a plurality of intents to an external server, based on word use information included in the user voice and summary information regarding the user voice generated based on user-related information being received from the external server, displaying the received summary information, based on a user feedback regarding the summary information being input, transmitting information regarding the user feedback to the external server, and based on response information regarding the user voice generated based on the user feedback being received from the external server, displaying the response information.

In accordance with another aspect of the disclosure, a controlling method of a server is provided. The controlling method includes based on identifying that a user voice received from a terminal device includes a plurality of intents, obtaining word use information from the user voice, obtaining user-related information from the user voice, identifying a response order regarding the plurality of intents based on the obtained word use information and user-related information, and providing information regarding the plurality of intents and summary information including response order information regarding each of the plurality of intents to the terminal device.

In accordance with another aspect of the disclosure, even if a verbose user voice including a plurality of sentences is input, an electronic apparatus identifies the intent by dividing the user voice into a plurality of data and thus, accurate response information can be provided.

In accordance with another aspect of the disclosure, since the order of providing response information is sorted based on word use information, user-related information and intent information, the response information may be provided sequentially based on importance and relevance. Therefore, the understanding regarding the response information of the user may increase.

In accordance with another aspect of the disclosure, by providing the summary information first without immediately providing response information to the user voice, user understanding and convenience may increase.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
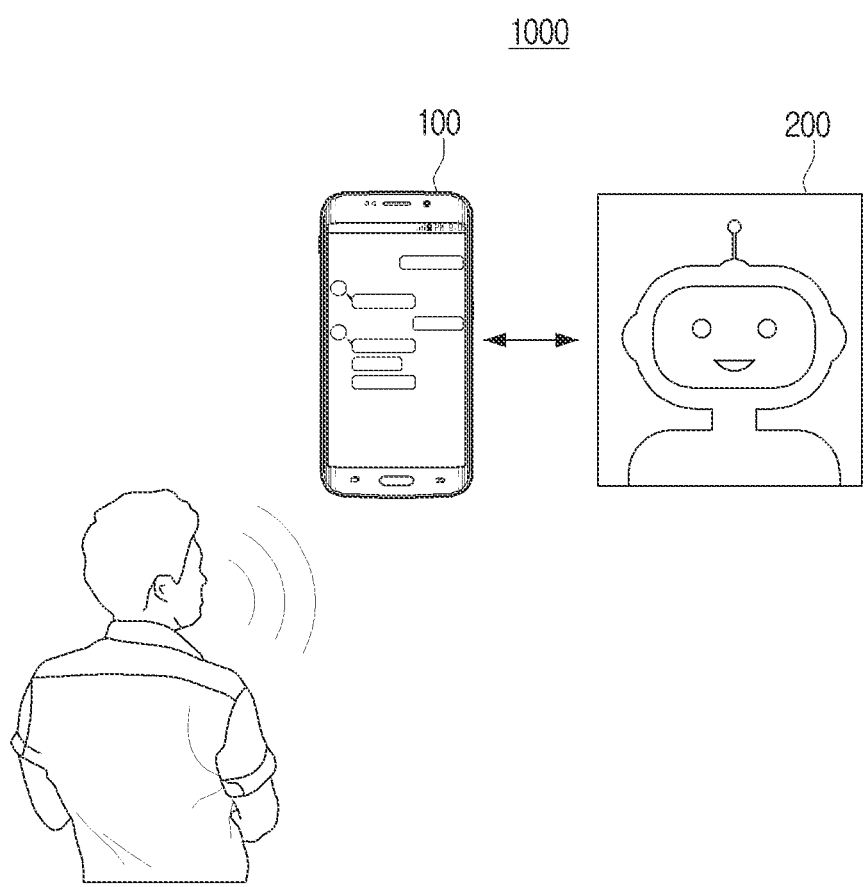
FIG. 1 is a view provided to schematically explain an electronic system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. In case it is determined that in describing embodiments, detailed explanation of related known technologies may unnecessarily confuse the gist of the disclosure, the detailed explanation will be omitted.

In the application, the terms "include" and "comprise" designate the presence of features, numbers, operations, components, elements, or a combination thereof that are written in the specification, but do not exclude the presence or possibility of addition of one or more other features, numbers, operations, components, elements, or a combination thereof.

In the description, the term "at least one of A or/and B" should be understood to mean one of "A", "B", or "A and B."

Expressions "first", "second", or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component).

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor (not illustrated) except for 'modules' or 'units' that should be realized in a specific hardware. In the disclosure, the term "user" may refer to a person who uses a terminal device (or an electronic device) or a device using a terminal device (e.g.: an artificial intelligence electronic apparatus).

The example embodiments of the disclosure will be described in greater detail below in a manner that will be understood by one of ordinary skill in the art. However, various embodiments may be realized in a variety of different configurations, and not limited to descriptions provided herein. Also, in order to describe the disclosure clearly, irrelevant descriptions have been omitted and throughout the specification, similar reference numbers are used for similar parts.

Hereinafter, an embodiment of the disclosure will be described in greater detail with reference to the accompanying drawings.

FIG. 1 is a view provided to schematically explain an electronic system according to an embodiment of the disclosure.

Referring to FIG. 1, an electronic system 1000 according to an embodiment includes a terminal device 100 and a server 200.

The terminal device 100 is a device that transmits an input user voice to the server 200 and provides information corresponding to a user voice received from the server 200. The terminal device 100 may display not only voice information received from the server 200 but also text information.

For example, the terminal device 100 may be implemented in various forms such as smartphone, tablet personal computer (PC), mobile phone, video phone, e-book reader, desktop PC, laptop PC, netbook computer, workstation, server, personal digital assistant (PDA), portable multimedia player (PMP), moving picture experts group phase 1 or phase 2 (MPEG-1 or MPEG-2) audio layer-3 (MP3) player, medical device, camera, wearable device, etc.

The server 200 may be a device that understands a user voice transmitted from the terminal device 100 and responds to the user voice. For example, the server 200 may include a chat-bot that simulates a human, and may provide response data in a voice form corresponding to a user's voice query and display data to the terminal device 100 through the chat-bot.

If the user voice transmitted from the terminal device 100 is long and verbose, that is, if the user voice including a plurality of intents is input, the server 200 should understand the user voice and provide the corresponding response information. Hereinafter, various embodiments of providing response information corresponding to the user voice included in a plurality of sentences will be described in detail.

Figure 2:
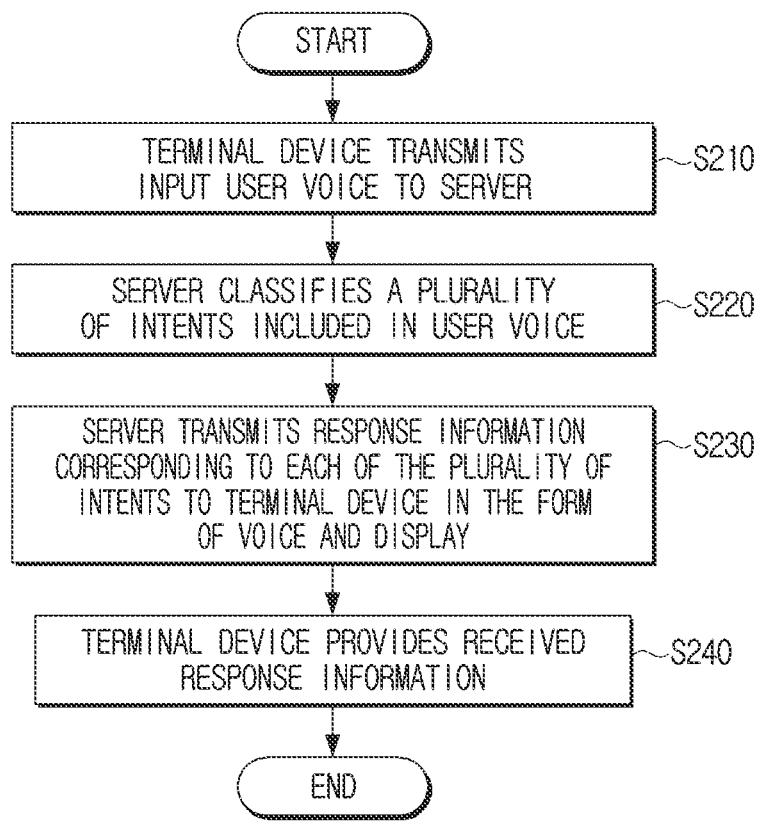
FIG. 2 is a flowchart provided to explain an operation between a terminal device and a server according to an embodiment of the disclosure.

FIG. 2 is a flowchart provided to explain an operation between a terminal device and a server according to an embodiment of the disclosure.

Referring to FIG. 2, the terminal device 100 may control a communication interface to transmit a user voice including a plurality of intents to the server 200 at operation S210.

For example, if the terminal device 100 is implemented as a smartphone, a user voice input through a microphone (not illustrated) may be transmitted to the server 200.

The server 200 may distinguish a plurality of intents included in a user voice at operation S220. That is, the server 200 may divide a user voice into a plurality of intents, and generate response information corresponding to each intent. Specifically, the server 200 may generate summary information regarding a user voice generated based on word use information and user-related information included in the user voice. Here, the word use information may include at least one of the number or frequency of use of the same word in a user voice, and the user-related information may include at least one of user profile information or user emotion information. In addition, the summary information may include information regarding a plurality of intents and response order information regarding each of a plurality of intents, which will be described in detail later.

The server 200 may transmit summary information regarding a user voice and response information corresponding to each of a plurality of intents to the terminal device 100 as data in the form of a voice and a display at operation S230.

The terminal device 100 may control a display (not illustrated) to display the summary information received from the server 200. The terminal device 100 may provide the received summary information not only through a display but also through a speaker (not illustrated). In addition to providing the summary information, the terminal device 100 may request a user feedback on information regarding a plurality of intents included in the summary information and response order information regarding each of the plurality of intents. When a user feedback regarding the summary information is input, the terminal device 100 may transmit information regarding the user feedback to the server 200.

The server 200 may modify the response information regarding a changed intent or change the order of providing response information based on the received user feedback information. The server 200 may transmit the changed (or generated) response information regarding the user voice to the terminal device 100 based on the user feedback.

The terminal device 100 may provide the received response information at operation S240. Specifically, the terminal device 100 may provide response information regarding a user voice through a display or a speaker.

Through the above-described operations of the terminal device 100 and the server 200, a user may be provided with a desired answer to an intended inquiry and recognize that the user has a conversation with a human counselor.

Figure 9:
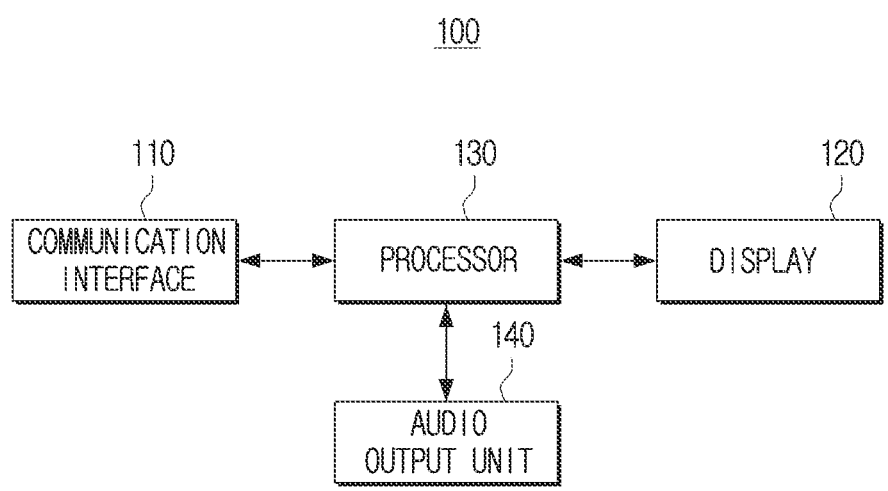
FIG. 9 is a block diagram provided to explain a configuration of a terminal device and a server according to an embodiment of the disclosure.

FIG. 9 is a block diagram provided to explain a configuration of a terminal device and a server according to an embodiment of the disclosure.

Referring to FIG. 9, the terminal device 100 includes a communication interface 110, a display 120, at least one processor 130 and an audio output unit 140. The server 200 includes a communication interface and at least one processor (not shown) in a similar manner.

Figure 3:
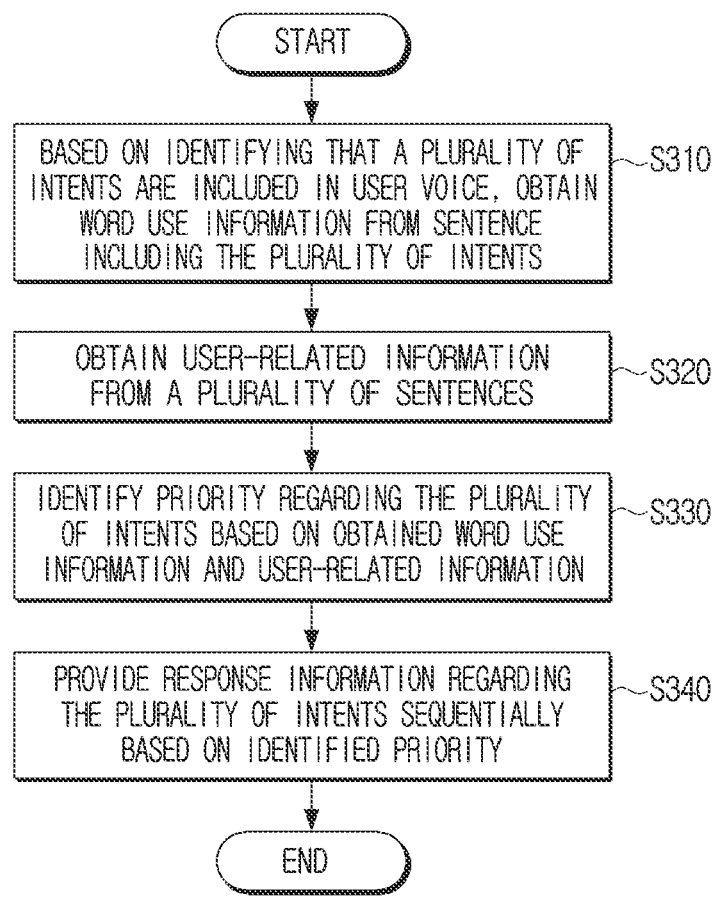
FIG. 3 is a flowchart for providing response information regarding a plurality of intents according to an embodiment of the disclosure.

FIG. 3 is a flowchart for providing response information regarding a plurality of intents according to an embodiment of the disclosure.

Referring to FIG. 3, according to an embodiment, the operation of figuring out a user's intent by identifying a plurality of intents included in a user voice may be performed in the server 200.

When it is identified that a plurality of intents are included in a user voice, the processor may obtain word use information from a sentence including the plurality of intents at operation S310. Specifically, the processor may identify whether a plurality of intents are included in a user voice based on an automatic speech recognition model, a natural language understanding model, and the like.

If it is identified that a plurality of intents are included in a user voice, the processor may classify (or segment) the user voice in units of intents. For example, if a user voice such as "I think my smartphone is defective. I can't user may phone because it's hot. Can I exchange it for free?" is input, the processor may classify the user voice as 3 pieces of data, that is, "I think my smartphone is defective", "I can't use the phone because it's hot" and "Can I exchange it for free?." According to an embodiment, the processor may identify a user's intent included in each sentence by dividing the user voice in units of sentences, but is not limited thereto.

Subsequently, the processor may obtain text data corresponding to voice data regarding each of the classified plurality of intents. According to an embodiment, an automatic speech recognition (ASR) model may convert user voice data into text data. However, the disclosure is not limited thereto, and when a user voice is input, the processor may convert the user voice into text data through an ASR model and then, classify the converted text data based on intents.

The processor may obtain word use information based on each converted text data. Here, the word use information includes at least one of the number or frequency of use of the same word in a user voice (or voice data). Specifically, the processor identifies the most frequently used word in a user voice, and identify a word repetition frequency indicating how often the identified word is used. Here, the word repetition frequency may be distinguished into various stages such as low, normal, high, and the like.

For example, in the case of the above example, "phone" is the most frequently used word, and it is identified as "low" since the word is used two times in three sentences.

The processor may obtain feature information of voice data corresponding to each of a plurality of intents. Here, the feature information of the voice data may include at least one of the length of the voice data, the size of the voice data, the speech speed, or the pitch of the voice data. The processor may obtain user-related information based on the obtained feature information of the voice data at operation S320.

Here, the user-related information may include at least one of user profile information or user emotion information. The user profile information may include user age, gender and the like. In particular, the emotion information may be classified into a plurality of emotion types such as dissatisfaction, satisfaction, anxiety, etc. In addition, the classified emotion type, for example, the emotion type of "dissatisfaction" may be classified into a plurality of stages such as "slightly dissatisfied", "dissatisfied", and "very dissatisfied", and such emotion information may be used to identify the priority of each sentence.

Subsequently, the processor may identify the priority of a plurality of intents based on the obtained word use information and the user-related information at operation S330. According to an embodiment, the processor may give priority to a plurality of intents based on the word use information and the user-related information. For example, the processor may give a high priority to a sentence including a very unsatisfactory emotion information or a sentence including a word used at a high frequency.

The processor may identify the priority of a plurality of sentences based on the intent information as well as the word use information and the user-related information. Here, the intent information is information including at least one of the type of each of the plurality of sentences or keyword information, and the processor may identify the intent information based on text data corresponding to each of the plurality of sentences. The type indicates whether the type of each sentence corresponding to the user voice is a query or a chat.

According to an embodiment, the processor may identify the first response order regarding a plurality of intents based on the word use information and the user-related information, and rearrange the identified first response order based on the intent information. Here, the response order regarding the plurality of intents means a priority regarding the plurality of intents.

For example, if a user voice is distinguished in units of sentences, and it is assumed that the user voice includes five sentences and each sentence includes an intent, and for convenience of explanation, the first sentence is represented as #1 and the fifth sentence is represented as #5 according to the speech order. For example, the processor may first identify the priority of each sentence in the order of #2, #5, #1, #3, and #4 based on the emotion information and the word use frequency. As such, the priority identified based on the word use information and the user-related information is referred to as the first priority (or the first response order).

Subsequently, the processor may rearrange the first priority based on the intent information. Specifically, the processor may rearrange the first priority order so that sentences having the same or similar intent among a plurality of sentences become adjacent in the priority order based on the intent information.

For example, #1 identified as the third rank is identified as a sentence with the same or similar intent as #2 identified as the first rank, the processor may rearrange the priority so as to place #1 identified as the third rank just below #2 identified as the first rank. Accordingly, #1 may be rearranged to the second rank to be in the order of #2, #1, #5, #3, and #4.

Since the response order corresponding to each sentence is determined according to the priority of the sentences, the sentences with the same or similar intent may be set as the adjacent priority so that the answer to the same or similar intent may be continuously provided. For example, if #2 is a battery problem, #1 is a battery consumption problem, the answers regarding the battery may be provided continuously by placing #2 and #1 adjacently. Thus, the understanding and convenience of the user may be increased.

The processor may provide the terminal device 100 with summary information regarding at least one of a plurality of intents and response information regarding each of the plurality of intents based on the identified priority. In this case, the terminal device 100 may provide summary information regarding a user voice including a plurality of intents prior to providing response information.

Specifically, the terminal device 100 may provide summary information including information regarding a plurality of intents and response order information regarding each of the plurality of intents. For example, the response information may include brief response information regarding a sentence having the highest priority among the priorities identified for a plurality of sentences, intent information included in at least one of the plurality of sentences, and the like.

For example, the terminal device 100 may inquire whether a response to the intent of the highest priority among the priorities identified for a plurality of intents may be provided first. For example, if the intent of the highest priority is a sentence regarding a "battery consumption problem", the terminal device 100 may provide a text or a voice such as "can I explain the battery consumption problem first" through a display or a speaker. Alternatively, the terminal device 100 may provide a list of all priorities identified for the plurality of intents, and inquire whether a response may be provided according to the order in the provided list.

Subsequently, when a user's feedback regarding the provided information is input, the input user feedback information may be transmitted to the server 200. The processor may change the order of providing response information based on the received user feedback information. For example, if a user does not agree with the response order, the terminal device 100 may provide a text or a voice such as "what problem do you want to know first?" or "please arrange the response order" and receive a feedback regarding the order of providing response information. The terminal device 100 may transmit the received user feedback information to the server 200, and the processor may modify the response information based on the received user feedback information and transmit the same to the terminal device 100. Specifically, the processor may change the order of providing response information based on the user feedback information, and provide the changed response information to the terminal device 100.

The terminal device 100 may provide the received response information at operation S340.

It is assumed that a user feedback that the information regarding a plurality of intents included in the summary information is not consistent with the user's intent is input to the terminal device 100. That is, it is assumed that the server 200 misunderstands a query intended by the user.

If a user feedback that the information regarding a plurality of intents included in the summary information is not consistent with the user's intent is input, the processor 130 may transmit the information regarding the user feedback to the server 200.

In this case, the server 200 may provide the terminal device 100 with list information regarding a query of a predetermined frequency or more from the general users. The processor 130 may control the display 120 to provide a list UI regarding a query of a predetermined frequency or more received from the server 200.

For example, the server 200 may transmit a Frequently Asked Questions (FAQ) list to the terminal device 100, and the processor 130 may provide a list of FAQs through a display to induce a user to select an intended query.

It is assumed that the server 200 does not obtain response information regarding a user voice or a user feedback. That is, it is assumed that the server 200 fails to identify the intent included in the user voice or fails to search response information regarding the user's intent.

In this case, the server 200 may transmit a signal indicating that the response information regarding the user voice or the user feedback is not obtained to the terminal device 100. When the signal indicating that the response information regarding the user voice or the user feedback is not obtained is received from the server 200, the processor 130 may display a UI indicating that response information regarding the user voice or the user feedback is provided in the second voice which is different from the first voice which is provided previously.

That is, the summary information or the response information was provided through a chat-bot of the first voice included in the server 200 previously, but if the server 200 does not find an answer to the user query, a human counselor of the second voice may provide an answer to the user query. However, the user may recognize that the human counselor of the first voice is changed to the human counselor of the second voice to provide an answer to the user query.

The processor may update the profile information of the terminal device 100 stored in the memory of the server 200 based on the information regarding a plurality of intents and the user feedback information. Here, the profile information may include the telephone number of the terminal device 100, the user feature information, and the like. The feature information is information accumulated based on the contents frequently asked by the user. For example, if a user frequently asks about a smartphone, the processor may consider information regarding a smartphone when identifying the corresponding user's intent. In addition, for example, when the heating problem of a smartphone is selected as the information that a user wishes to hear first based on the user feedback information, the processor may update the profile information by giving a high weighted value to the heating problem in the case of the corresponding user afterwards to identify the priority of the plurality of intents, etc.

That is, the processor may generate information regarding a user voice based on the updated profile information.

If a user agrees with the response order, the terminal device 100 may provide response information regarding each of the plurality of sentences sequentially based on the identified priority.

The processor may obtain a template regarding response information based on the user-related information, and provide response information regarding each of a plurality of intents sequentially based on the obtained template. For example, the processor may obtain a template stored in a memory (not illustrated) or obtain a template from an external server based on the user-related information. Here, when the response information is provided, the tone, the speech speed, etc. may be changed according to the template.

According to an embodiment, the processor may obtain a template based on the user's emotion information. For example, if the emotion information of the user is in a "very dissatisfied" state, the processor may obtain a template including the speech tone of apology and provide and provide the same to the terminal device 100. Alternatively, if the user's age is equal to or greater than a predetermined age, the processor may obtain a template including a honorific title or a template having a slow speech speed when providing response information. If a dialect of a specific region is included in the user voice, the processor may obtain a template of a speech tone including the corresponding dialect and provide the same to the terminal device 100.

It is described that the terminal device 100 transmits an input user voice to the server 200, and the server 200 understands the user voice and responds to the user voice, but the disclosure is not limited thereto.

According to another example, the terminal device 100 may be a device which understands a user voice and responds to the user voice through a virtual secretary using an artificial intelligence model (or a neural network model or a learning network model). In this case, the server 200 including a separate chat-bot does not exist, and the terminal device 100 may directly understand the user voice and provide response information corresponding to the user voice. Here, the virtual secretary function is a dedicated program for providing AI-based service (e.g., a voice recognition service, a secretary service, a translation service, a search service, etc.), and may be executed by the existing general purpose processor (e.g., central processing unit (CPU)) or a separate artificial intelligence (AI) dedicated processor (e.g., graphics-processing unit (GPU), etc.). In particular, the virtual secretary service may be implemented as a system using an AI agent such as Bixby™, Assistant™, Alexa™, etc., and may be referred to as an AI secretary, a voice secretary, a virtual secretary, etc. Hereinafter, the virtual secretary service will be referred to as a virtual secretary for convenience of explanation. The virtual secretary function can be executed when a predetermined user voice (e.g., "Bixby", etc.) is input or a button on the terminal device 100 (e.g., a button for executing a voice secretary) is pressed. When a user voice is input while the voice secretary function is executed, the terminal device 100 may transmit the user voice to the terminal device 100 and receive response information corresponding to the user voice. Subsequently, the terminal device 100 may provide the received response information through a speaker (not illustrated), the display 120, etc.

Figure 4:
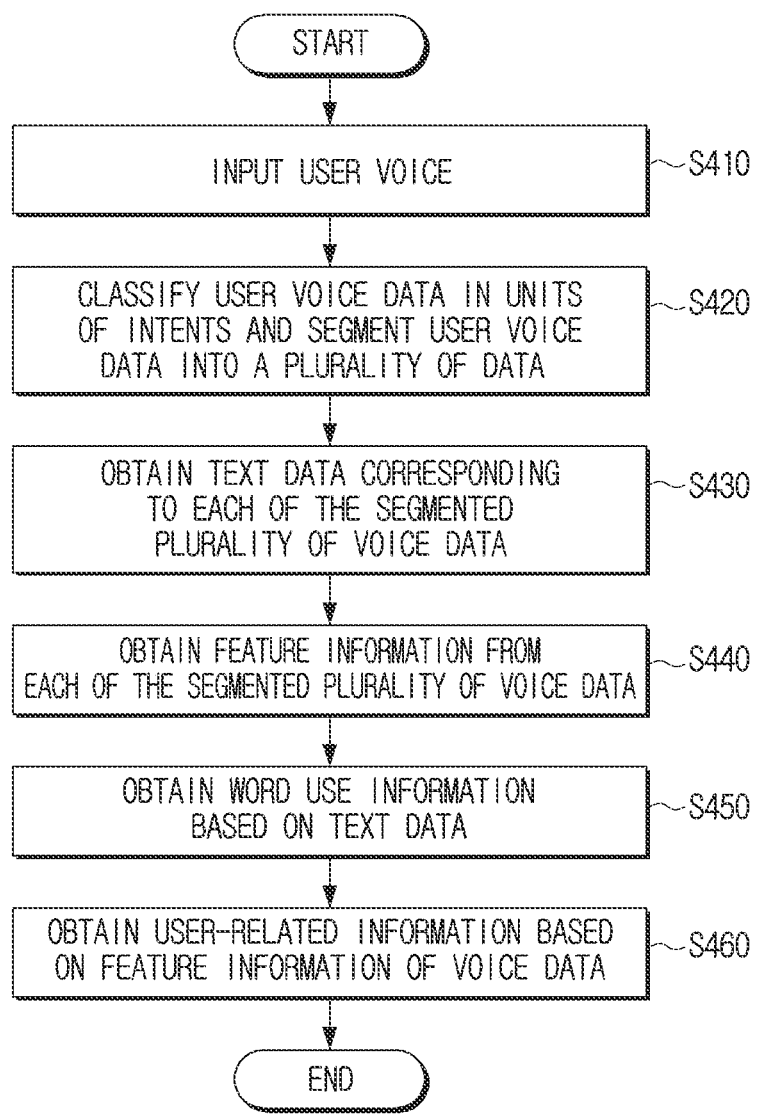
FIG. 4 is a flowchart provided to explain an operation of obtaining word use information and user-related information according to an embodiment of the disclosure.

FIG. 4 is a flowchart provided to explain an operation of obtaining word use information and user-related information according to an embodiment of the disclosure.

FIG. 4 is a flowchart provided to explain S310 and S320 of FIG. 3 in detail.

Referring to FIG. 4, when a user voice is input at operation S410, the processor may segment the user voice data into a plurality of pieces of data by dividing the user voice data in units of intents at operation S420. For example, it is assumed that a user voice, "I think my Galaxy phone is bad. I can't use my phone because it gets hot. When I play a game, my phone suddenly gets hot. I am afraid my phone will burst. Can I exchange it for free? Or let me know the nearest service center", is input. In this case, the processor may segment the user voice into six pieces of data such as "I think may Galaxy phone is bad", "I can't use my phone because it gets hot", "When I play a game, my phone suddenly gets hot", "I am afraid my phone will burst", "Can I exchange it for free?", and "Or let me know the nearest service center" based on the units of intents. For example, if each intent is included in a sentence, the user voice data may be classified by sentence, but is not limited thereto.

The processor may obtain text data corresponding to each of the segmented plurality of voice data at operation S430. For example, the processor may convert each of the plurality of voice data into text data using an ASR module.

In addition, the processor may obtain feature information from each of the segmented plurality of voice data S440 at operation. For example, the processor may obtain feature data that the voice length of the first sentence is 2 seconds, the speech size is 70%, the speech rate is normal, and the pitch is normal and the feature data that the voice length of the second sentence is 1.5 seconds, the speech size is 75%, the speech rate is normal, and the pitch is high.

The processor may obtain word use information based on the text data at operation S450. Specifically, the processor may identify a word that is repeated most frequently in a plurality of text data, and identify the repetition frequency of the identified word. For example, in the user voice of "I think my Galaxy phone is bad. I can't use my phone because it gets hot. When I play a game, my phone suddenly gets hot. I am afraid my phone will burst. Can I exchange it for free? Or let me know the nearest service center", the most repetitive word is 'phone', and 'phone' is used four times out of six sentences, so the repetition frequency of the word can be identified as 'normal.' Alternatively, the second model may identify the most repeated word in each sentence and the repetition frequency of the corresponding word. That is, the processor may obtain the word use information, that is, information regarding a language preference of the user.

In addition, the processor may obtain user-related information based on the feature information of voice data at operation S460. Specifically, the processor may obtain at least one of profile information including the age and gender of the user or the user emotion information. For example, if the volume of the user voice is large and the speech rate is fast, the processor may identify the user emotion information as a dissatisfied state. Such emotion information may be distinguished and identified in a plurality of stages. For example, the emotion information includes dissatisfaction, normal, satisfaction, and the like, and each emotion information may be divided into a plurality of stages such as "very high, high, normal, low, very low", and the like. Sentences in which the user's dissatisfied feelings are highly measured may have a high priority.

Since a user who speaks a plurality of sentences is generally not changed, the second model may identify user profile information based on a part of user voice data. For example, the processor may identify the user profile information using only the first sentence of the user voice, and may not identify the user profile information with respect to subsequent sentences. However, since the user emotion information may be changed for each sentence, the processor may identify the user emotion information in each of the plurality of sentences.

The processor may obtain combined information by combining the word use information and the user-related information. For example, the combined information may include "age: 30s, gender: female, emotion information: very dissatisfied, the most repeated word: phone, and the word repetition frequency: normal."

Figure 5:
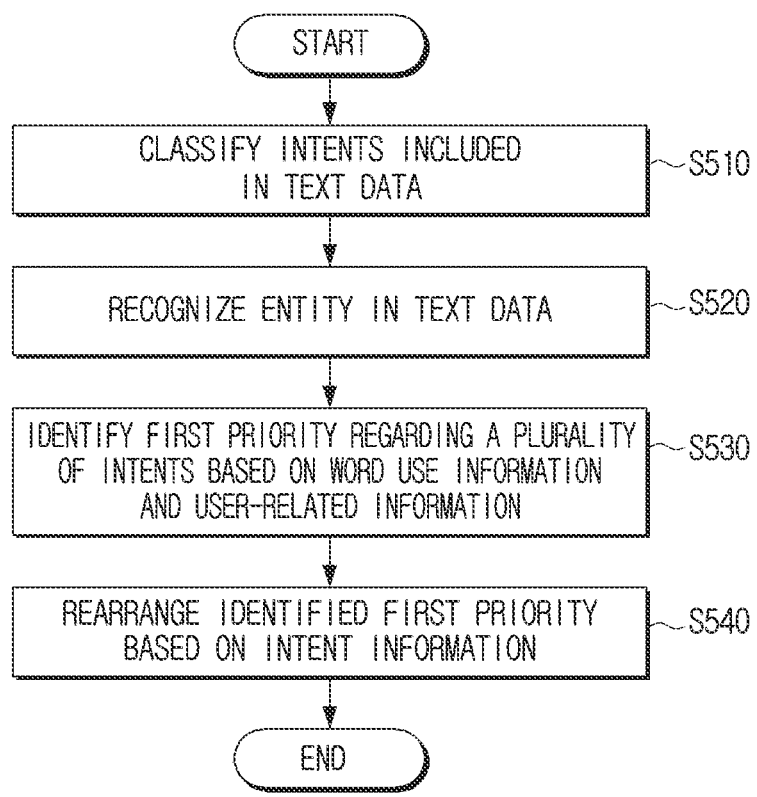
FIG. 5 is a flowchart provided to explain an operation of identifying a response order regarding a plurality of intents included in a user voice according to an embodiment of the disclosure.

FIG. 5 is a flowchart provided to explain an operation of identifying a response order regarding a plurality of intents included in a user voice according to an embodiment of the disclosure.

FIG. 5 is a flowchart provided to explain S330 of FIG. 3 in detail.

Referring to FIG. 5, the processor may classify intents included in the text data at operation S510. For example, the processor may classify intents included in each of the text data through an Intent Classification Model. Specifically, the processor may give "intent_id" to each sentence. For example, "intent_id=1" may mean a battery problem, and "intent_id=6" may mean a battery consumption problem. In addition, "intent_id=−1" means a case where the intent is not identified. As such, the intent_id is stored in the memory as table-type information, and the processor may analyze keyword information included in each text data and assign the intent_id to each sentence. In addition, the processor may identify the type of each sentence based on the text data. For example, the processor may identify whether a sentence including each intent is a query or a chat. For example, in the process of converting a user voice into a text, it may be determined whether each sentence ends with a period or a question mark based on the user's intonation, etc., and a period or a question mark may be reflected in the text data. The processor may identify the text data including the question mark as a query.

The processor may transmit intent_id information and type information for each text data to a database, and obtain parent intent_id and general use frequency information regarding each text data from the database. Here, the parent intent_id means classification information at the highest level of intent_id. For example, parent_id of "intent_id=6", which means a battery consumption problem, may be "intent_id=1." This is because battery issues are a higher level concept that includes a battery consumption problem. The parent intent_id information of each intent_id may be stored in the database in the form of a table.

In addition, the processor may obtain general use frequency information corresponding to intent_id for each text data. Here, the general use frequency information obtained from the database may be use information of a general user. For example, the processor may obtain information regarding how often a general user inputs a query or a chat regarding "intent_id=6" which means a battery consumption problem. Such general use frequency information may be divided into a plurality of stages such as "very high, high, normal, low, and very low."

That is, the processor may classify intents based on intent information including intent_id, parent intent_id, type, general use frequency information, and the like of each sentence.

In addition, the processor may recognize an entity in the text data corresponding to each sentence at operation S520. For example, the processor may recognize an entity included in each sentence through a Name Entity Recognition (NER) model. Here, the entity recognition means recognizing a named entity. For example, in the text data, "Galaxy A phone seems to be defective", the NER model may recognize "Galaxy A" as an entity.

Subsequently, the processor may obtain intent information and information including entity recognition information. For example, the obtained information may include "text: my Galaxy A phone seems to be defective, entity: Galaxy A, type: query, intent_id:1, general use frequency: very high, and parent intent_id: 1." Such an example is output information regarding one sentence, and such information may be obtained regarding the remaining sentences.

The processor may obtain combination information regarding a user voice by combining all of the intent information, the information including entity recognition information and combination information previously obtained. For example, information may be combined such as "user propensity=age: 30's, gender: female, emotion information: very dissatisfied, the maximum repetition word; phone, word repetition frequency: normal/sentence analysis=text: I think my Galaxy A phone is defective, entity: Galaxy A, type: query, intent_id: 1, general use frequency: very high, parent intent_id: 1." In the above example, information regarding only one sentence is described, but information regarding each of a plurality of sentences may be combined.

The processor may identify the first priority regarding a plurality of intents based on word use information (keyword information) and user-related information (emotion information) at operation S530.

The processor may identify the maximum repetition word and word repetition frequency from the combination information regarding the user voice. The processor may identify the maximum repetition word as a keyword and identify a sentence including the keyword. The processor may identify emotion information of the sentence including the identified keyword, and identify a priority regarding each of a plurality of sentences including each intent based on the level of the identified emotion information. Specifically, the processor may give a high priority to a sentence with a high dissatisfied emotion. The processor may identify a priority of a plurality of sentences based on not only the emotion information but also the general use frequency. For example, when the level of emotion information of different sentences are the same, the processor may give a higher priority to a sentence with a high frequency of general use. That is, the processor may consider the emotion information first and then, consider the general use frequency. In addition, the processor may identify a priority according to the emotion information by giving a higher priority to a sentence including a keyword than a sentence including the maximum repetition word but does not include the keyword. Here, it is described that each intent is included in different sentences, but a plurality of intents may be included in one sentence.

When it is identified that all sentences do not include the maximum repetition word and the keyword, the processor may identify a priority of a plurality of sentences according to the emotion information.

That is, the processor may identify the first priority regarding a plurality of sentences based on the word use information (keyword information) and user-related information (emotion information).

Subsequently, the processor may identify a priority regarding each of a plurality of intents by rearranging the first priority identified based on the intent information at operation S540. For example, the processor may group sentences having the same or similar intent information in the sentences which are arranged based on the first priority. Specifically, the fourth model may identify "parent intent_id" of each sentence and group sentences including the same "parent intent_id."

For example, it is assumed that a user voice includes five sentences and each sentence is referred to as #1, #2, #3, #4, and #5 for convenience of explanation. The first priority may be identified in the order of #2, #5, #1, #3, and #4 based on the emotion information. The fourth model may identify "parent intent_id" included in each sentence. It is assumed that #2 (parent intent_id=1), #5 (parent intent_id=3), #1 (parent intent_id=1), #3 (parent intent_id=none), and #4 (parent intent_id=3).

In this case, #2 and #1 have the same parent intent_id and thus, may be classified as one group. However, since #2 has a higher priority based on the emotion information than #1, #2 may be placed before #1.

In addition, since #5 and #4 have the same parent intent_id, they may be classified as one group. Likewise, since #5 has a higher priority based on the emotion information than #4, #5 may be placed before #4.

As such, #2 and #1 having parent intent_id=1 may be classified as the first group, and #5 and #4 having parent intent_id=3 may be classified as the second group, but #2 has a higher priority based on the emotion information than #5, the first group may be a higher priority than the second group.

Accordingly, the first priority may be rearranged as #2, #1, #5, #4, and #3.

The processor may extract phrases from the text of the sentence of which intent is not classified through a Phrase Extraction machine learning model. The processor may include the extracted phrases in the information regarding the rearranged sentences.

Figure 6:
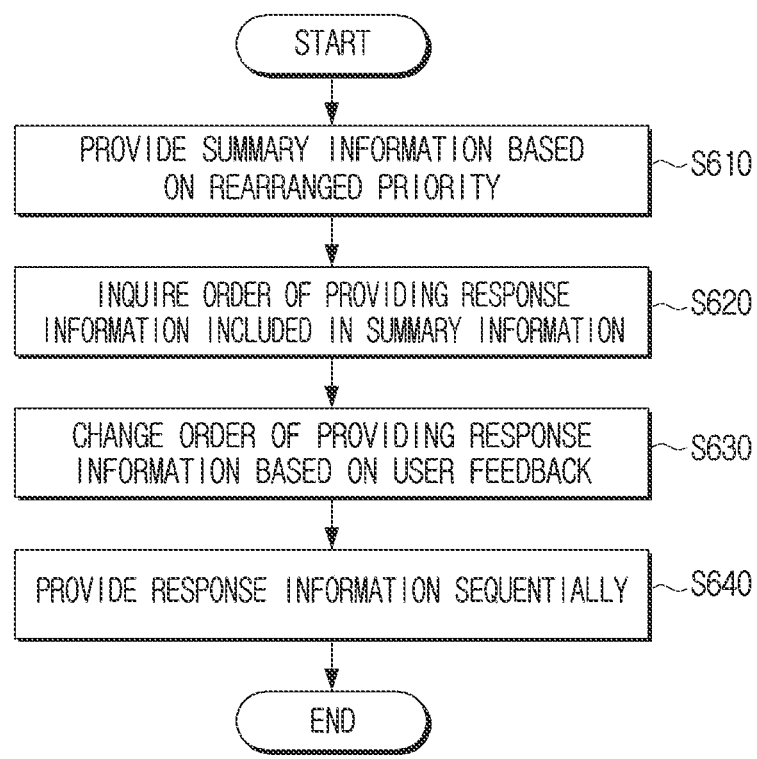
FIG. 6 is a flowchart provided to explain an operation of providing response information according to an embodiment of the disclosure.

FIG. 6 is a flowchart provided to explain an operation of providing response information according to an embodiment of the disclosure.

FIG. 6 is a flowchart provided to describe S340 of FIG. 3 in detail.

Referring to FIG. 6, the processor may generate summary information based on the rearranged priority and provide the same to the terminal device 100 at operation S610. Specifically, the summary information is to summarize a user voice including a plurality of intents, and may include information regarding the plurality of intents and response order information regarding each of the plurality of intents.

For example, based on the summary information provided from the server 200, the terminal device 100 may provide summary information such as "I am very sorry that you feel inconvenience in using your smartphone (initial answer). When you watch a video or play a high-performance game, you may experience a heating phenomenon (brief response information to the first priority sentence). It is believed that you would like to know A, B and C. May I answer in this order?." That is, the summary information includes A, B and C corresponding to the plurality of intents included in the user voice and it is possible to check whether they match the user's intent. This will be described later in detail.

The processor may obtain a template regarding the summary information from a memory or an external server based on the user-related information, and provide the summary information based on the obtained template. For example, the processor may generate a query based on the user-related information, and obtain a template regarding a summary response from the memory based on the generated query.

The processor may generate an initial response based on the contents regarding the keyword of a plurality of sentences. In addition, the processor may generate brief response information regarding the first priority sentence based on the intent information of the first priority sentence, the keyword information, the phrase extracted from the sentence of which intent is not classified, etc. In addition, the processor may provide response order information based on the information regarding the plurality of intents and the priority where the first priority is rearranged.

After providing the summary information to the terminal device 100, the processor may inquire the order of providing response information included in the summary information through the terminal device 100 at operation S620. Specifically, the processor may provide information regarding the order of providing response information, which is identified through the terminal device 100 and request a feedback thereof.

When a feedback regarding the providing order is input from a user, the order of providing response information may be changed based on the input feedback at operation S630.

Subsequently, the processor may provide the response information sequentially based on the changed order of providing response information through the terminal device 100 at operation S640.

For example, the processor may provide a query such as "May I explain the battery consumption problem first?" through the terminal device 100, and when the feedback of consent is input from the user, may provide response information sequentially based on the order of providing the response information. On the other hand, if the feedback of dissent regarding the response order is input from the user, the processor may request an additional feedback regarding the order of providing the response order through the terminal device 100. For example, an additional feedback such as "what would you like to know first?" may be requested. The processor changes the order of providing the response information based on the input user feedback, and may provide the response information based on the changed order.

For example, the processor may obtain a template regarding the response information from a memory or an external server based on the user-related information, and provide the response information based on the obtained template. For example, the processor may generate a query based on the user-related information, and obtain a template regarding a summary response from the memory based on the generated query. Here, the query may be generated separately for each of a plurality of sentences, and intent_id may be further used when the query is generated. Here, when the response information is provided, the speech tone, the speech rate, etc. may vary according to a template. When the slots included in the template are not filled, the processor may provide additional questions regarding the unfilled slots to the terminal device 100, and generate response information based on the feedback regarding the additional questions.

Figure 7:
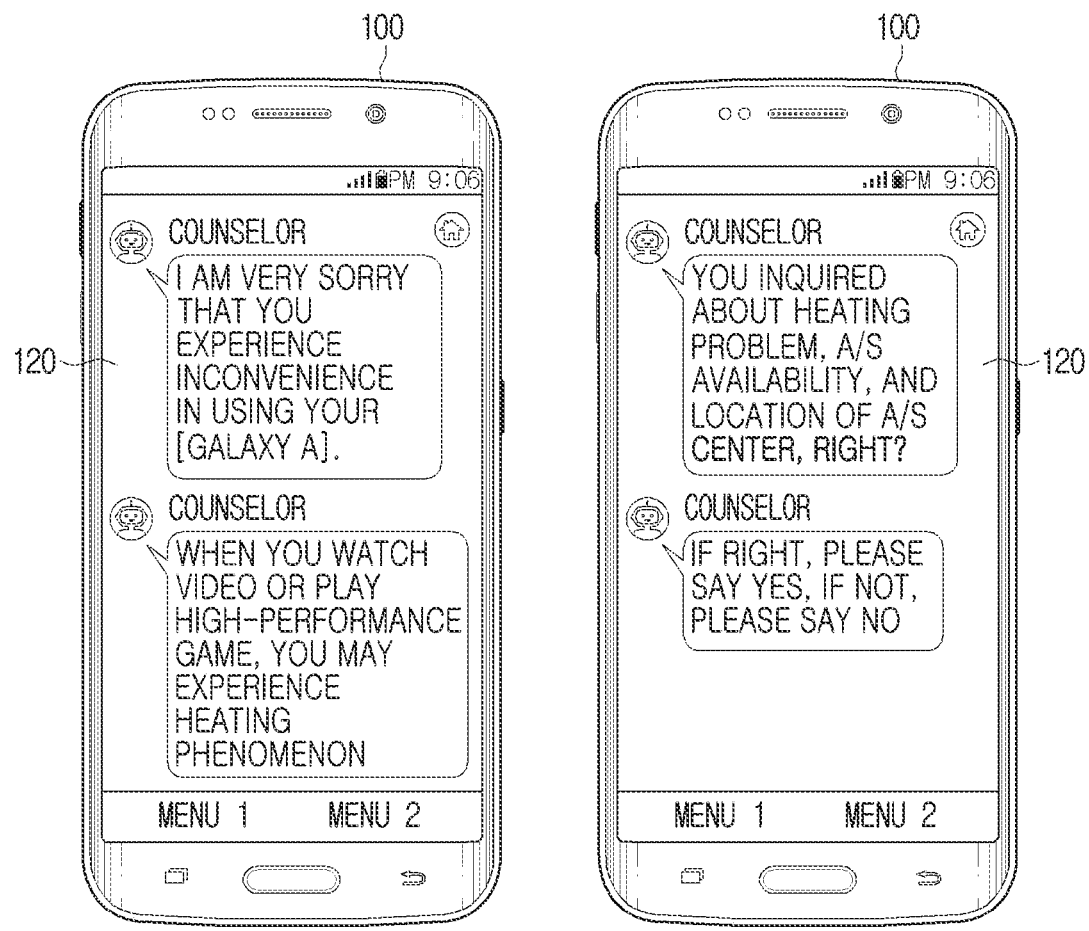
FIG. 7 are views illustrating examples of a user interface (UI) for providing summary information according to an embodiment of the disclosure.

FIG. 7 are views illustrating examples of a UI for providing summary information according to an embodiment of the disclosure.

Referring to FIG. 7, the terminal device 100 may provide a UI for providing summary information through the display 120. For example, the terminal device 100 provides summary information through a UI in the form of a chatting window, and may provide a simple greeting based on the entity information (e.g., Galaxy A) and the emotion information (e.g., dissatisfaction) such as "Hello. I am very sorry that you feel inconvenience in using your [Galaxy A]. When you watch a video or play a high-performance game, you may experience a heating phenomenon." In addition, the terminal device 100 may provide a plurality of intents included in a user voice through a UI. For example, if it is identified that the intents included in the user voice is a heating problem, A/S availability, and the location of an A/S center, the terminal device 100 may provide a user intent such as "you inquired about a heating problem, A/S availability, and the location of an A/S center, right?", and request a user feedback such as "if right, please say yes, if not, please say no."

The terminal device 100 may not only display the above-described summary information through a UI but also provide the summary information in a voice through an audio output unit 140. In addition, the terminal device 100 may receive a user feedback through a touch of the display 120 or may receive a user voice through a microphone. As such, the user receives the summary information through a UI as well as a voice of a chat-bot and thus usability and convenience can be enhanced.

Figure 8:
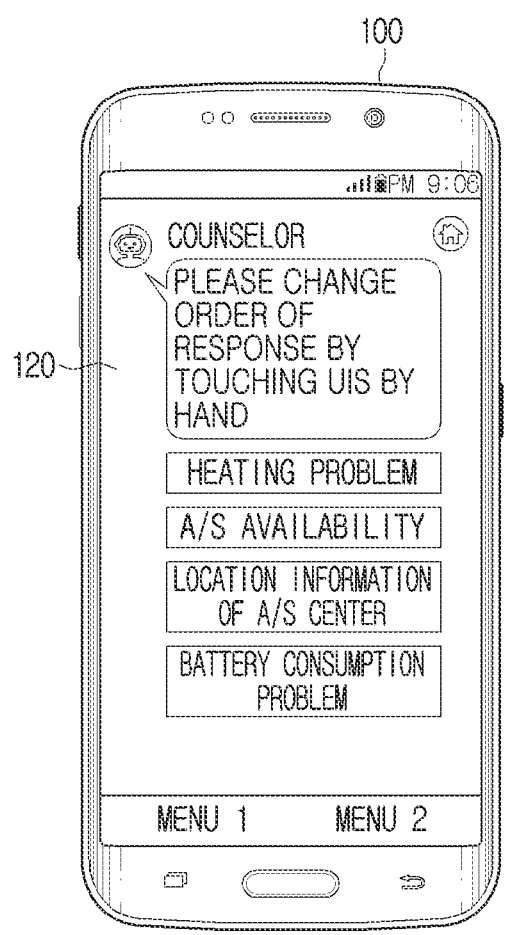
FIG. 8 is a view provided to explain an operation of changing a response order according to an embodiment of the disclosure.

FIG. 8 is a view provided to explain an operation of changing a response order according to an embodiment of the disclosure.

Referring to FIG. 8, the terminal device 100 may provide summary information including information regarding a plurality of intents and the response order information regarding each of the plurality of intents through the display 120. For example, the terminal device 100 may provide the response order regarding the plurality of intents in which the above-described first priority is rearranged. For example, if the identified response order is "heating problem", "A/S availability", "the location information of an A/S center", and "battery consumption problem", the terminal device 100 may arrange the intents in order as illustrated in FIG. 8. In addition, the terminal device 100 may request a user feedback regarding the response order together. For example, the terminal device 100 may provide a message such as "please change the order of response by touching the UIs by hand." In this case, the user may move the UI for each intent in the drag and drop form through the user's touch. Accordingly, the response order regarding the plurality of intents may be changed. Subsequently, the terminal device 100 provides the changed response order to the server 200 and the server 200 may provide the response information to the terminal device 100 based on the received response order. Then, the terminal device 100 may provide the received response information through the display 120 and the audio output unit 140.

Referring again to FIG. 9, the communication interface 110 includes a circuitry, and is configured to communicate with the server 200 or an external device (not illustrated).

According to an embodiment, the communication interface 110 may perform communication with the server 200 through a wireless base station. Specifically, the communication interface 110 may identify the nearest wireless base station, and perform communication with the server 200 through the identified base station and a predetermined frequency. For example, the communication interface 110 may transmit a user voice to the server 200 through electric waves.

The display 120 is configured to display various information transmitted from the server 200.

The display 120 may be implemented as various forms of displays such as liquid crystal display (LCD), organic light-emitting diode (OLED), Liquid Crystal on Silicon (LCoS), Digital Light Processing (DLP), quantum dot (QD) display panel, quantum dot light-emitting diodes (QLED), micro light-emitting diode (micro LED), and the like.

The display 120 may provide summary information and response information corresponding to a user voice under the control of the processor 130. In addition, the display 120 may display a response order identified in order to receive a feedback regarding the order of providing the response information.

The display 120 may be implemented in the form of a touch screen having an inter-layered structure with a touch pad. Here, the touch screen may be configured to detect not only the touch input position and size but also the touch input pressure.

The processor 130 is electrically connected to the memory, and controls the overall operations of the terminal device 100. The processor 130 controls the overall operations of the terminal device 100 using various comments or programs stored in the memory. In particular, according to an embodiment, the main CPU may copy programs in the RAM according to a command stored in the ROM, and access the RAM to execute the corresponding program. Here, the program may include an artificial intelligence model, etc.

In addition to the above-described elements, the terminal device 100 may include elements such as the audio output unit 140, a memory, and the like.

The audio output unit 140 is configured to output an audio signal. The audio output signal 140 may be implemented as a speaker and in some cases, may be implemented as an external element of the terminal device 100 such as a sound bar.

The audio output unit 140 may provide summary information and response information corresponding to a user voice. In addition, the audio output unit 140 may provide a response order identified in order to receive a feedback regarding the order of providing the response information.

The memory is electrically connected to the processor 130, and may store necessary data for various embodiments of the disclosure.

The memory is configured to store at least one instruction, and may be implemented in the form of a memory embedded in the terminal device 100 according to a data storage use, or may be implemented in the form of a memory detachable from the terminal device 100. For example, in the case of data for driving the terminal device 100, the data may be stored in a memory imbedded in the terminal device 100, and in the case of data for an expansion function of the terminal device 100, the data may be stored in a memory detachable from the terminal device 100. The memory embedded in the terminal device 100 may be implemented as at least one of a volatile memory (e.g., dynamic RAM (DRAM), static RAM (SRAM), or synchronous dynamic RAM (SDRAM, and the like), a non-volatile memory (e.g., one time programmable read-only memory (ROM) OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), hard drive, or sold state drive (SSD), and the memory detachable from the terminal device 100 may be implemented in the form of a memory card (e.g., compact flash (CF), secure digital (SD), micro secure digital (Micro-SD), mini secure digital (Mini-SD), extreme digital (xD), multi-media card (MMC), etc.), an external memory connectable to a universal serial bus (USB) port (e.g., a USB memory), and the like.

According to an embodiment, if the terminal device 100 includes a virtual secretary and directly provides response information corresponding to a user voice, the memory may store models necessary to perform the virtual secretary. For example, the memory may store an Automatic Speech Recognition (ASR) model, a Natural Language Understanding (NLU) model, a dialogue manager (DM) model, a natural language generator (NLG) model, a text to speech (TTS) model, and the like. The server 200 includes the communication interface and the processor. The communication interface and the processor included in the server 200 are overlapped with the configuration of the terminal device 100 and thus, further description will be omitted.

The above-described methods according to the various embodiments of the disclosure may be implemented in the form of an application which can be installed in the existing terminal device.

In addition, the above-described methods according to the various embodiments of the disclosure may be implemented only by software upgrade or hardware upgrade of the existing terminal device.

In addition, the above-described various embodiments of the disclosure may be performed through an embedded server provided in the terminal device or at least one external server of the terminal device.

According to an embodiment of the disclosure, the aforementioned various embodiments of the disclosure may be implemented as software including instructions stored in machine-readable storage media, which can be read by machines (e.g.: computers). The machines refer to devices that call instructions stored in a storage medium, and can operate according to the called instructions, and may include a terminal device according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, methods according to the aforementioned various embodiments of the disclosure may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: play store™). In the case of on-line distribution, at least a portion of a computer program product may be stored in a storage medium such as the server of the manufacturer, the server of the application store, and the memory of the relay server at least temporarily, or may be generated temporarily.

In addition, according to an embodiment of the disclosure, the aforementioned various embodiments of the disclosure may be implemented in a computer or a recording medium that can be read by a device similar to a computer by using software, hardware or a combination thereof. In some cases, the embodiments described in this specification may be implemented as a processor itself. According to implementation by software, the embodiments such as procedures and functions described in this specification may be implemented as separate software modules. Each of the software modules may perform one or more functions and operations described in this specification.

Computer instructions for performing processing operations of devices according to the aforementioned various embodiments of the disclosure may be stored in a non-transitory computer-readable medium. When computer instructions stored in such a non-transitory computer-readable medium are executed by the processor of a specific device, processing operations at devices according to the aforementioned various embodiments are made to be performed by the specific device.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a digital versatile disc (DVD), a hard disc, a blue-ray disc, a USB, a memory card, a ROM and the like.

Also, each of the components according to the aforementioned various embodiments (e.g.: a module or a program) may consist of a singular object or a plurality of objects. In addition, among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order, or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A terminal device comprising:
a communication interface including circuitry;
a display; and
at least one processor configured to:
control the communication interface to transmit a user voice including a plurality of intents to an external server,
based on word use information included in the user voice and summary information regarding the user voice generated based on user-related information being received from the external server, control the display to display the summary information,
based on a user feedback regarding the summary information being input, transmit information regarding the user feedback to the external server, and
based on response information regarding the user voice generated based on the user feedback being received from the external server, control the display to provide the response information.

2. The device as claimed in claim 1, wherein the summary information comprises information regarding the plurality of intents and response order information regarding each of the plurality of intents.

3. The device as claimed in claim 1, wherein the at least one processor is further configured to:
based on a user feedback that information regarding the plurality of intents included in the summary information is not consistent with a user's intent being input, transmit the information regarding the user feedback to the external server, and
control the display to provide a list user interface (UI) regarding a query of a predetermined frequency or more, received from the external server.

4. The device as claimed in claim 1, further comprising:
an audio output unit,
wherein the at least one processor is further configured to:
control the audio output unit to provide the summary information or the response information in a first voice, and
based on a signal indicating that response information regarding the user feedback is not obtained being received from the external server, control the display to display a UI indicating that response information regarding the user feedback is provided in a second voice that is different from the first voice.

5. A server comprising:
a communication interface including circuitry; and
at least one processor configured to:
based on identifying that a user voice received from a terminal device through the communication interface includes a plurality of intents, obtain word use information and user-related information from the user voice,
identify a response order regarding the plurality of intents based on the obtained word use information and user-related information, and
control the communication interface to provide information regarding the plurality of intents and summary information including response order information regarding each of the plurality of intents to the terminal device.

6. The server as claimed in claim 5, wherein the at least one processor is further configured to:
generate response information regarding the user voice based on the identified response order, and
based on user feedback information regarding the summary information being received from the terminal device, amend response information based on the user feedback information and transmit the response information to the terminal device.

7. The server as claimed in claim 6, further comprising:
a memory configured to store profile information of the terminal device,
wherein the at least one processor is further configured to:
update the profile information based on information regarding the plurality of intents and the user feedback information, and
generate response information regarding the user voice based on the updated profile information.

8. The server as claimed in claim 5, wherein the at least one processor is further configured to:
obtain feature information of voice data corresponding to each of the plurality of intents and text data of the voice data,
obtain the word use information based on the text data, and
obtain the user-related information based on feature information of the voice data.

9. The server as claimed in claim 8, wherein the feature information of the voice data comprises at least one of a length of the voice data, a size of the voice data, a speech speed or a pitch of the voice data.

10. The server as claimed in claim 5,
wherein the word use information comprises at least one of a number of use or a use frequency of a same word in the user voice, and
wherein the user-related information comprises at least one of user profile information or user emotion information.

11. The server as claimed in claim 5, wherein the at least one processor is further configured to:
identify intent information including at least one of a type or keyword information of each of the voice data based on text data of the voice data, and
identify the response order based on the identified intent information, the word use information and the user-related information.

12. The server as claimed in claim 11, wherein the at least one processor is further configured to:
- identify a first response order regarding the plurality of intents based on the word use information and the user-related information, and
- re-arrange the identified first response order based on the identified intent information.

13. A controlling method of a terminal device, the controlling method comprising:
- transmitting a user voice including a plurality of intents to an external server;
- based on word use information included in the user voice and summary information regarding the user voice generated based on user-related information being received from the external server, displaying the summary information;
- based on a user feedback regarding the summary information being input, transmitting information regarding the user feedback to the external server; and
- based on response information regarding the user voice generated based on the user feedback being received from the external server, displaying the response information.

14. The method as claimed in claim 13, wherein the summary information comprises information regarding the plurality of intents and response order information regarding each of the plurality of intents.

15. The method as claimed in claim 13, wherein the transmitting information regarding the user feedback to the external server comprises:
- based on a user feedback that information regarding the plurality of intents included in the summary information is not consistent with a user's intent being input, transmitting the information regarding the user feedback to the external server, and
- displaying a list user interface (UI) regarding a query of a predetermined frequency or more, received from the external server.

16. The method as claimed in claim 13, further comprising:
- controlling an audio output unit to provide the summary information or the response information in a first voice, and
- based on a signal indicating that response information regarding the user feedback is not obtained being received from the external server, displaying a UI indicating that response information regarding the user feedback is provided in a second voice that is different from the first voice.

17. A controlling method of a server, the method comprising:
- based on identifying that a user voice received from a terminal device includes a plurality of intents, obtaining word use information from the user voice;
- obtaining user-related information from the user voice;
- identifying a response order regarding the plurality of intents based on the obtained word use information and user-related information; and
- providing information regarding the plurality of intents and summary information including response order information regarding each of the plurality of intents to the terminal device.

18. The method as claimed in claim 17, further comprising:
- generating response information regarding the user voice based on the identified response order, and
- based on user feedback information regarding the summary information being received from the terminal device, amending response information based on the user feedback information and transmitting the response information to the terminal device.

19. The method as claimed in claim 18, further comprising:
- updating profile information based on information regarding the plurality of intents and the user feedback information; and
- generating response information regarding the user voice based on the updated profile information.

20. The method as claimed in claim 17, further comprising:
- obtaining feature information of voice data corresponding to each of the plurality of intents and text data of the voice data,
- wherein the obtaining word use information comprises obtaining the word use information based on the text data, and
- wherein the obtaining the user-related information comprises obtaining the user-related information based on feature information of the voice data.

* * * * *